United States Patent [19]

Chapman

[11] 4,221,770

[45] Sep. 9, 1980

[54] AMMONIUM NITRATE PARTICULATE ABATEMENT PROCESS

[75] Inventor: Michael T. Chapman, Columbus, Kans.

[73] Assignee: Gulf Oil Corporation, Pittsburgh, Pa.

[21] Appl. No.: 935,192

[22] Filed: Aug. 21, 1978

[51] Int. Cl.² ............................................. C01C 1/18
[52] U.S. Cl. ..................................... 423/396; 55/90; 55/97; 55/527; 423/215.5; 55/523
[58] Field of Search ................... 55/68, 70, 84, 85, 89, 55/90, 91, 93, 94, 97, 259, 527, 523; 423/237, 239, 395, 396, 215.5

[56] References Cited

U.S. PATENT DOCUMENTS

| | | | |
|---|---|---|---|
| 2,619,405 | 11/1952 | Greer et al. | 423/396 |
| 2,821,261 | 1/1958 | Vixler et al. | 55/527 |
| 3,535,852 | 10/1970 | Hirs | 55/523 |
| 3,540,190 | 11/1970 | Brink, Jr. | 55/97 |
| 3,861,889 | 1/1975 | Takae et al. | 55/70 |

*Primary Examiner*—Bernard Nozick
*Attorney, Agent, or Firm*—Carl A. Cline

[57] ABSTRACT

In a process for removing particulate ammonium nitrate from the steam aerosol effluent from a reactor in which nitric acid is neutralized with ammonia, wherein said steam aerosol effluent is scrubbed with a water spray to produce suspended droplets of aqueous ammonium nitrate solution and said droplets are then removed from the effluent by passage through a fibrous mat, an improvement with respect to durability of the fibrous mat and efficiency of droplet removal is obtained by passing the effluent stream through a mat consisting of fibers of average diameter between 5 and 20 microns which have the following composition by weight: between 40 and 50 percent alumina, from 45 to 55 percent silica, less than 6 percent zirconia, less than 1.5 percent $B_2O_3$ and less than one percent trace amounts of other inorganics.

2 Claims, No Drawings

AMMONIUM NITRATE PARTICULATE ABATEMENT PROCESS

DESCRIPTION OF THE INVENTION

Ammonium nitrate is customarily manufactured by neutralizing nitric acid with ammonia. The heat of neutralization is such that there is obtained hot liquid ammonium nitrate containing a small percentage of water, which will solidify on cooling and a vapor effluent consisting principally of steam. The steam effluent of the process, however, contains droplets of nitric acid and ammonium nitrate in aerosol form. Release of the effluent directly to the atmosphere is not tolerated in most populated areas, so various methods of de-misting and removal of particles from the steam aerosol are employed.

A portion of the steam effluent, more than one-fourth, is readily removed by condensation with liquid ammonia. The resulting vaporized ammonia may then be used in manufacture of nitric acid and in the neutralization process. The remainder of the vapors contain typically about one percent or less by weight ammonium nitrate in the form of particles having a diameter within the range of 0.001 to 1.0 microns. Removal of these particles by simple filtration has not proved to be feasible. The only method of removal which has proved to be successful is treatment of the effluent with a water spray, followed by entrapment of the resulting suspended droplets by passage of the effluent through a fibrous mat. This process is usually referred to as treatment by scrubbing followed by de-misting.

It is in the operation of the de-misting apparatus that problems arise. Obviously, saturated steam which contains droplets of ammonium nitrate solution is highly corrosive. The aqueous solution which is obtained in the scrubbers and from de-misting can have a pH as low as 3 or as high as 11 under upset conditions. The high temperature, fluctuation of pH and high velocity of gas flow contribute to corrosion and erosion problems. The de-misting apparatus, consisting of a housing containing removable frames which hold the fibrous mat pads is customarily made of stainless steel with satisfactory corrosion resistance. The fibrous mats, however, have never been satisfactory. Fibrous mats tend to disintegrate within a relatively short time, usually developing holes through which the mist escapes. Use of large diameter fibers in the mat to obtain longer service life results in less de-misting efficiency. A great variety of acid-resistant fibers have been tried. Organic polymeric fibers move under the vibration and force of gas flow, forming channels and losing efficiency. Glass fibers quickly erode and weaken, breaking and allowing holes to form. Polymer-coated glass fibers have been found to perform satisfactorily for a time, but after a period of about seven months they quickly deteriorate. Ceramic fibers of various sorts have been tried but have been found to migrate under the influence of the gas stream, break as a result of vibration, or decline in de-misting efficiency within a relatively short time.

I have discovered that exceptionally long life and de-misting efficiency can be obtained from use of a fibrous mat, preferably made up of layers of a non-woven web, or blanket of ceramic fibers which are within specific ranges of diamters and chemical composition. Briefly the improvement in the process of removing particulate ammonium nitrate by water scrubbing followed by de-misting consists of passing the effluent stream containing liquid droplets through a mat consisting of fibers of between 5 and 20 microns preferably 8 to 18 microns in average diameter which have the following composition by weight: between 40 and 50 percent alumina, from 45 to 55 percent silica, less than 6 percent zirconia, less than 1.5 percent $B_2O_3$ and less than one percent trace amounts of other inorganics.

By way of illustration, there is discussed below a specific example of use of the improved method.

The quantity of overhead steam from an ammonium nitrate neutralizer unit was determined to be on the average about 14,000 pounds per hour. This is equivalent to 6,570 cubic feet per minute at standard conditions. Routinely, from 28 to 45 percent of these vapors are condensed by the cooling effect of liquid ammonia. The vaporized ammonia resulting from this condensation step is used as feed stock for nitric acid and ammonium nitrate manufacturing processes. The remainder of the overhead vapors (from 3560 to 4720 cubic feet per minute) flow through a scrubber. The vapors are essentially saturated steam at 100° C. with a density of 0.037 pounds per cubic foot. The vapors contain approximately 0.95 weight percent ammonium nitrate, the majority of which is present in the form of an aerosol, having particles with diameters of from 0.001 to 1.0 micron. About 0.4 percent ammonia gas is usually also present. The vapors pass into a scrubber in which a group of ten spray nozzles are located, each delivering up to 1.1 gallons per minute of water at 100 psig. This spray cools the vapors and substantially converts the aerosol into a mist. The liquid which settles out of the scrubbers is automatically adjusted to a pH of less than 3.0. A portion of this liquid is recycled to the spray nozzles, along with demineralized water as make-up. On top of the scrubber are the ceramic fiber pads through which the scrubbed vapors pass before reaching the atmosphere. The fiber pads are in a structure made of stainless steel and which consists of a rectangular housing surrounding two inverted V-shaped frames, in each of which there are two fiber pads held between 12-mesh stainless steel screening at angles slightly inclined from the vertical. As the vapors exit from the scrubber they pass through this inverted W-shaped filter, consisting of a total of four pads, each of which is 2 ft. 8 in. wide by 3 ft. 11 in. long and is about one inch in thickness. The total area of the filter pads is 71 ft$^2$. As the mist and liquid droplets are trapped in the pads, the liquid drains off the pads and falls into the scrubber. Each pad consists of two blankets of ceramic fibers, one of coarse fiber and one of fine fiber. The blankets are lightweight battings of long staple ceramic fibers which are bonded with a small percentage of organic thermosetting resin, to prevent the fibers from migrating under the force of the stream of vapors which passes through the pads. The physical properties and chemical composition of the fibers making up the pads are summarized below:

| Physical Properties | Coarse Fiber | Fine Fiber |
|---|---|---|
| Color | Yellow | Yellow |
| Avg. Fiber Dia.(range) | 13–20 Microns | 5–9 Microns |
| Avg. Dia. Specific Pads | 18 Microns | 8 Microns |
| Density of Blanket | 6 lbs/ft$^3$ | 6 lbs/ft$^3$ |
| Width of Blanket | 48 in. | 48 in. |
| Nominal Thickness of Blanket | 1/2 in. | 1/2 in. |

| -continued | | |
|---|---|---|
| Binder | 3–5% by wt. | 3–5% by wt. |
| Chemical Properties (Both Coarse and Fine Fiber) | | |
| $Al_2O_3$ | 43.9% by wt. | |
| $S_iO_2$ | 50.1% | |
| $B_2O_3$ | 0.15% | |
| $ZrO_2$ | 5.1% | |
| Trace Inorganics | 0.75% | |

The exemplified ceramic fiber blankets are sold commercially for use as fluid filters, high temperature insulation and sound absorption and as catalyst carriers. The chemical composition of the fibers makes them extremely resistant to attack by nitric acid and ammonium nitrate, which is of critical importance in the present process. Even after months of exposure to the vapors from the neutralizer scrubber, there is no indication of weakening or breaking of fibers. The chemical resistance in this application is a very specific property, as the fibers are not resistant, for example, to strong solutions of phosphoric acid or strong alkalies.

The chemical composition of the fibers is selected so as to obtain a combination of ability to resist chemical attack, ability to be melt-spun into fibers of sufficient length so that they can be easily anchored into place in a pad, or blanket, flexibility and resistance to fatigue under vibration. A composition of 50% silica and 50% alumina has desirable properties but is difficult to fabricate. A composition of approximately 45% alumina, 5% zirconia and 50% silica is preferred, with no more than one percent of other inorganics. Fibers which are so short that they are bonded in only one place, or which contain many flaws, or are irregular in diameter are likely to have a short service life.

It will be understood by those who are skilled in the art that filter pads of sufficient area so as to reduce gas velocity and pressure differential are to be preferred. It will also be understood that the construction of the demister should be sufficiently rigid, so as not to subject the pads to undue vibration, thereby shortening their service life.

I claim:

1. In a process for removing particulate ammonium nitrate from the steam aerosol effluent from a reactor in which nitric acid is neutralized with ammonia, wherein said steam aerosol effluent is scrubbed with a water spray to produce suspended droplets of aqueous ammonium nitrate solution and said droplets are then removed from the effluent by passage through a fibrous mat, the improvement consisting of passing said effluent stream containing liquid droplets through a mat consisting of fibers of average diameter between 5 and 20 microns which have the following composition by weight: between 40 and 50 percent alumina, from 45 to 55 percent silica, less than 6 percent zirconia, less than 1.5 percent $B_2O_3$ and less than one percent trace amounts of other inorganics.

2. In a process for removing particulate ammonium nitrate from the steam aerosol effluent from a reactor in which nitric acid is neutralized with ammonia, wherein said steam aerosol effluent is scrubbed with a water spray to produce suspended droplets of aqueous ammonium nitrate solution and said droplets are then removed from the effluent by passage through a fibrous mat, the improvement consisting of passing said effluent stream containing liquid droplets through a mat consisting of fibers of average diameter between 8 and 18 microns which have the following composition by weight: about 44 percent alumina, about 50 percent silica, about 5 percent zirconia, about 0.15 percent $B_2O_3$ and the balance trace amounts of other inorganics.

* * * * *